United States Patent [19]

Rabus et al.

[11] 4,224,842
[45] Sep. 30, 1980

[54] GEAR SHIFTING ENGAGEMENT SHOCK CONTROL SYSTEM

[75] Inventors: Friedrich Rabus, Schwieberdingen; Ferdinand Grob, Besigheim, both of Fed. Rep. of Germany

[73] Assignee: Robert Bosch GmbH, Stuttgart, Fed. Rep. of Germany

[21] Appl. No.: 899,895

[22] Filed: Apr. 26, 1978

[30] Foreign Application Priority Data

Apr. 30, 1977 [DE] Fed. Rep. of Germany ....... 2719350

[51] Int. Cl.² .................... B60K 41/06; B60K 41/08; B60K 41/10
[52] U.S. Cl. .................................................. 74/866
[58] Field of Search ....................................... 74/866

[56] References Cited

U.S. PATENT DOCUMENTS

| | | | |
|---|---|---|---|
| 3,688,609 | 9/1972 | Friedline | 74/866 |
| 3,713,355 | 1/1973 | Wakamatsu et al. | 74/866 |
| 3,719,096 | 3/1973 | Sprague et al. | 74/866 X |
| 3,747,438 | 7/1973 | Toyoda et al. | 74/866 |
| 3,750,495 | 8/1973 | Ito et al. | 74/866 |
| 3,752,011 | 8/1973 | Casey et al. | 74/866 X |
| 3,942,393 | 3/1976 | Forster et al. | 74/866 |
| 4,073,203 | 2/1978 | Wurst et al. | 74/866 |

*Primary Examiner*—Leslie Braun
*Attorney, Agent, or Firm*—Frishauf, Holtz, Goodman & Woodward

[57] ABSTRACT

To control shifting shock upon starting of a stopped vehicle with an automatic transmission and when shifting from neutral into a drive gear (first, or reverse), a signal representative of transmission input speed (therefore equally representative of engine output speed) is used, twice differentiated, to control a shift-shock control system when shifting between neutral and a drive gear. When the vehicle is moving above a predetermined speed, e.g. 7 km/h, the automatic shock control system is controlled by a twice differentiated signal derived from the output of the transmission and when shifting is to be commanded between first and second, and second and third (or other gears), respectively.

12 Claims, 1 Drawing Figure

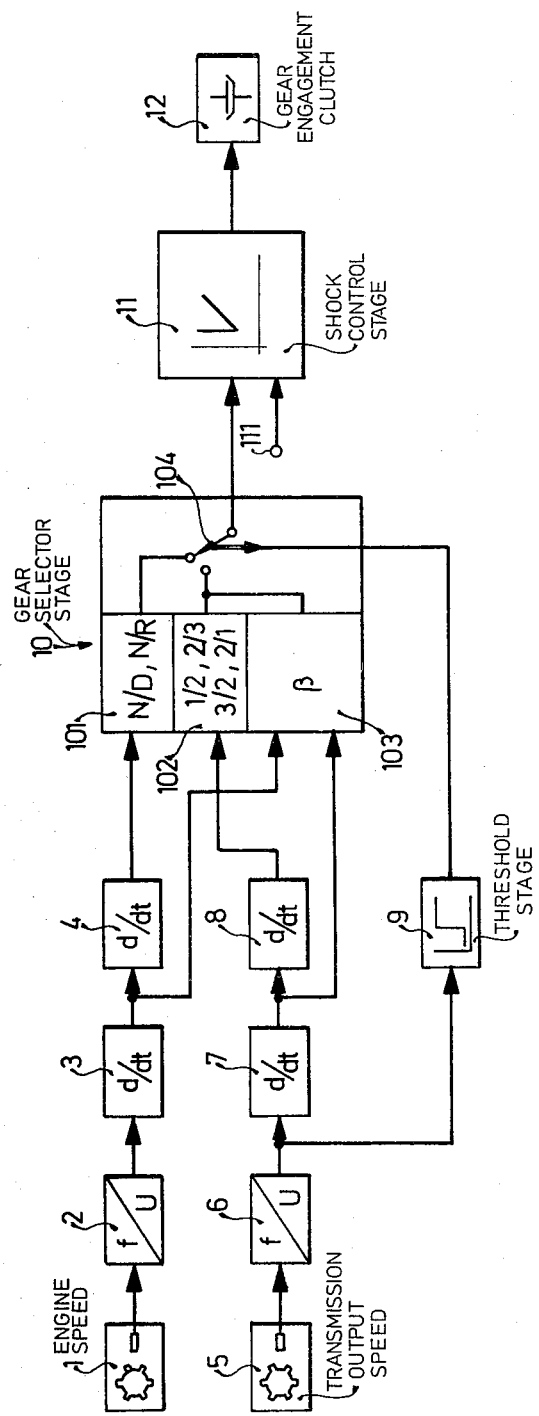

GEAR SHIFTING ENGAGEMENT SHOCK CONTROL SYSTEM

Reference to related applications and patents, the disclosure of which is incorporated by reference, and all assigned to the assignee of the present application:

U.S. Ser. No. 882,138, filed Feb. 28, 1978; SAUER et al;
U.S. Ser. No. 867,332, filed Jan. 6, 1978, RABUS et al;
U.S. Ser. No. 867,307, filed Jan. 6, 1978, REMBOLD et al; and
U.S. Ser. No. 407,975, filed Nov. 11, 1964 now U.S. Pat. No. 3,433,101;
U.S. Ser. No. 869,449, filed Jan. 16, 1978, WILL et al;
U.S. Ser. No. 883,873, filed Mar. 6, 1978 REMBOLD et al.

The present invention relates to a control system to control the engagement shock when engaging gears in an automatic transmission of an automotive vehicle, when the vehicle is standing still, and the transmission is commanded to change between neutral and a forward or reverse gear.

BACKGROUND AND PRIOR ART

The related applications and patents disclose various automatic transmissions which are electronically controlled and which include systems to ease the shock which occurs at the vehicle if gears are changed. Specifically, it has previously been proposed to ease the shock occurring at the vehicle if the vehicle is stationary, and the gear is in neutral (N) position, and the shift command lever is moved from N to an operating position in which the vehicle will move, for example drive (D), engaging a first gear, or reverse (R). Control systems are also known to ease the shock upon shifting of gears when the vehicle is already moving, for example upon shifting between first and second, second and third gear, or vice versa.

Decrease of the switching jolt or shock can be obtained hydraulically, for example by providing oil nozzles or relief valves in the pressure system; electronic elements, such as electronic control of friction clutches or friction elements in a transmission can also be used, the engagement of the friction elements being gradual and the rate of engagement being controlled in dependence on the deviation between a desired acceleration and actual acceleration, that is, in its extreme, a severe jolt.

U.S. Pat. No. 3,942,393 to which German Disclosure Document DE-OS No. 21 24 024 corresponds discloses a method and apparatus in which friction elements in an automatic transmission are controlled in dependence on change in engine speed. These frictional elements are, as customary, clutches and brake bands controlling engagement of various gear elements in a planetary gear drive.

It has also been proposed to control friction elements of a stepped transmission gear box in dependence on both engine speed and transmission output speed. For example, the input clutch of the gear is first engaged in dependence on a predetermined threshold value of the transmission gear speed $n_{GO}$ in a linear engagement motion. In a second control phase, the difference between the jolt actually occurring at the vehicle $R_{ist}$, and a predetermined maximum permissible jolt $R_O$, as well as the change of engine speed $n_M$ with respect to time, are used as control parameters. When the engine speed and the transmission output speed have approached each other to such an extent that the difference is below a predetermined speed difference $\Delta n$, then a third control parameter is superimposed on the control signal during a third control phase. These various control signals provide a relationship, with respect to time, of engine or motor speed and transmission speed which converge, if plotted on a graph, with an angle with respect to each other which may not exceed a predetermined angular value $\beta_s$. For ease of explanation, this angle may be referred to as the speed convergence angle. In such devices, therefore, small transmission speeds which cannot be sensed easily and with sufficient accuracy, the clutch is first directly controlled and thereafter, in two further phases, control is based on a constant or fixed speed difference between gear input and gear output and, eventually, to provide for smooth complete, final engagement, by the speed convergence angle in dependence on the relative speed differences between input and output speed and their convergence.

It has also been proposed to decrease the jolt upon gear changing in an automatic transmission by sensing the switching or gear changing jolt which actually occurs although the frictional engaging elements have not been completely engaged as yet. From this initial jolt, a maximum value of the jolt to be expected is then computed, assuming that the clutch will engage completely. The time of complete engagement is likewise computed. A comparison is made with the maximum which is permissible upon gear changing. The difference between these signals is then applied as a control or command signal or command parameter to suitably control the friction engagement elements for soft or smooth or gradual engagement.

It has also been suggested to reduce the jolt in vehicles when the gear selection lever is moved from neutral (N) to a drive range (D, 1, or R) and to reduce the jolt by first engaging a higher gear, for example third gear, than the gear which would actually be used for driving, the first engagement of the higher gear being for a short period of time only. Such a system is described, for example, in co-pending application U.S. Ser. No. 869,449, filed Jan. 16, 1978, WILL et al, assigned to the assignee of the present application.

Difficulties still arise if it is desired to change a gear selection lever between neutral and a drive position at a time when the vehicle is stationary, since the jolt occurring at the vehicle cannot be sensed equally well when the vehicle is stationary as when it is already moving or rolling.

THE INVENTION

It is an object of the present invention to provide a control system for an automatic transmission in which the shifting shock or jolt which occurs when the transmission is moved from neutral to a vehicle operating position, that is, when the transmission is controlled to move the vehicle from stationary to running condition or, generally upon up-shifting, is reduced.

Briefly, a gear shifting selection stage is so arranged that it has a first portion which controls change of gears between disengage or neutral (N) position, and a first drive gear (low, or L); or the first gear of drive (D) or reverse, (R). The gear selection stage further includes a second portion which controls change of operating gears, that is, from first to second, second to third, etc., and in the reverse, for example third to second, and second to first gear; in other words, the second portion controls up-shifting and down-shifting of already engaged gears at the time when the vehicle is moving. The first portion, controlling change of gears between neutral and a moving range (L, D, R), is controlled by a signal forming the second derivative, with respect to time, of the output speed of the engine. When the vehicle has reached a certain speed, which can be determined, for example, from the output of the transmission, which speed is preferably in the range of to about 10 km/h, a switch-over command signal is provided which changes control of the jolt or shock control system to the second portion, as a function of the second derivative of gear box or transmission output speed. Additionally, a convergence angle control can be provided to further control smooth engagement of the respective gears when shifting is to be effected under command of the second portion.

The system has the advantage that a shifting jolt or shock can be accurately sensed even if the vehicle is stationary, or moving only very slowly. A jolt or shifting shock control system thus can be provided which is matched to the operating conditions of the vehicle and in which the two different types of shock, selection of a gear when the vehicle is stationary or only moving slowly on the one hand, and already moving and shifting between operating drive gears, on the other, can be sensed and processed.

In accordance with a preferred embodiment of the invention, a selection switching system is provided in which the respective stages sense the operating jolts based on different considerations—transmission output speed, or engine speed, respectively—and transfer shock or jolt control command signals to a shock or jolt control stage.

Drawing, illustrating a preferred example, wherein the single FIGURE is a general basic schematic block diagram to determine and control the switching or gear changing jolt or shock in the vehicle, whether the vehicle is stopped or already moving.

It is well known that the break-away torque required to move a vehicle from stopped to only slow speed operating conditions is greater than to accelerate the same vehicle over a similar speed difference. Conversely, the switching jolt or shock upon changing from stopped to even only slowly moving vehicle is substantially greater than that upon changing between a vehicle moving at a given speed and changing to movement at another speed.

Many known gear change shock control systems utilize an arrangement in which a commanded or desired or permissible value is compared with the actual jolt or shock which occurs, or would occur if permitted to persist, at the vehicle itself. An operating element is then commanded in dependence on the difference of the actual and the maximum permissible jolt. Sensing of the actual jolt is difficult in actual practice due to the nature of the transducers required, which would be relatively complex. If the vehicle is already moving, then gear changing jolts which disturb the operator and annoy passengers, interfering with operating comfort of the vehicle, can be noticed upon automatic change of gears as the vehicle is moving. These jolts and shocks can be sensed by using accelerometers. The accelerometers may utilize signals already available at the vehicle, for example a signal representative of output speed from the transmission. The jolt or shock upon gear changing can be sensed by twice differentiating the signal, that is, sensing the rate of acceleration (or deceleration, which is the algebraic negative of acceleration). Sensing jolts or shock by twice differentiating a signal is possible, however, only if the vehicle is already moving since the customary speed transducers, such as star-wheels, gear teeth on a gear or the like, provide a signal which can be evaluated only if a certain minimum speed is exceeded. Consequently, the signal can be used only for a moving vehicle. The requirements placed on the purity of the signal wave form increases as the number of differentiations increases. Thus, to utilize a speed signal in a jolt control system, it must have excellent wave form since double differentiation would substantially enhance any disturbance or interference pulses and would greatly magnify deviations from a theoretically ideal wave form. A star-wheel or tooth-transducer coupled to the output of a transmission can become entirely useless if the vehicle is stopped and the automatic transmission is shifted from neutral (N) into an operating range (R, L, D). In the usual type of transmission, the first or the reverse gear is engaged and a clutch is closed between the torque converter and the transmission gear box. The elements within the gear box, as well as the driving engine, are thereby braked; this can be sensed at the vehicle as a jolt.

It has been found, in accordance with the present invention, that the jolt which the vehicle experiences can be sensed by utilizing change in engine speed, as a reaction to the sudden load placed thereon. Accordingly, the present invention is directed to a jolt control system in which the change in engine speed is sensed as a sensing signal for shock to control soft engagement of transmission elements upon change of the transmission between neutral and an operating position.

Referring now to the FIGURE: An engine speed transducer 1 is coupled to the output of the engine, to provide output signals representative of engine speed. Such a transducer may already be available in an automotive vehicle, for example to control ignition pulses. It is shown in the drawing, schematically, as an inductive transducer, although other systems may be used. The signal derived from the engine speed transducer 1 is applied over a frequency-voltage converter 2 to a first differentiator 3. The first derivative or acceleration signal is applied to a second differentiator 4. The output from differentiator 4 will be the second differential or rate of acceleration (deceleration) of engine speed.

A transmission output speed transducer 5, which may be similar to transducer 1, provides output signals which are converted into analog signals by a frequency-voltage converter 6 which are then twice differentiated in differentiators 7, 8 to derive output signals therefrom representative of the rate of change of acceleration (deceleration) of the transmission. The system includes a gear selector stage 10, shown only schematically. Gear selector stage 10 is subdivided into two portions, a first portion 101 which includes the selection change between neutral and an operating range, that is, between neutral and drive (N/D) and neutral and reverse (N/R). The change between neutral and drive will, in actual gear box operation, usually be a change between neutral and a low gear. The second portion of the gear selector stage 10 includes change from first to second gear, second to third gear—and possible others—and down-shifting, third to second, and second to first gear. This shifting of the second portion can be controlled manually or automatically, as desired; or, in some arrangements, provide for automatic control with a manual override. This would be the usual form to permit, manually, placing a certain gear in engagement, for example to provide for engine braking whereas, under normal operating conditions, the manual operation of the gear selector lever would be only between neutral and reverse, or neutral and drive, with the automatic feature of the second portion controlling respective gear changing between first gear and other higher gears, both in the up-shifting and down-shifting direction. The gear selector stage 10 includes a third portion 103 which is the convergence angle control section. The convergence angle control section is provided to decrease the switching jolt by sensing the speed differences and the rate of change of speed differences between transmission input and output and thereby permit approach of the transmission input and output speeds at a gradual rate. The gear selector stage, and the various portions thereof, themselves, are known. For purposes of the present invention, they may be considered direct connections which transfer signals from input to output without processing of the signals, when gear changing, as selected, is commanded. The input signals from elements 3, 4, 7 and 8 are selectively connected to shock control stage 11 by switch 104.

The convergence angle portion 103 and the second portion 102 are connected together and to one terminal of transfer switch 104. The output of the first stage 101 is connected to another terminal of the transfer switch 104. The position of the transfer switch 104 is controlled by the output from a speed threshold stage 9 which derives its input from the transmission output speed transducer 5, specifically from the speed signal derived from the frequency-voltage converter 6. When the speed of the vehicle, as determined by the speed of the output of the transmission in a first gear range, has reached a predetermined value, for example in the order of about 10 km/h, the threshold stage 9 will respond and cause an output signal to be transmitted to transfer switch 104 to change the switch from the position shown in the FIGURE to the other position, that is, to change the switch so that its input/output path will be from the second and third portions of the gear selector stage. The output from switch 104 is connected to a shock control stage 11. The shock control stage 11 receives a reference, or "maximum permissible" shock signal at terminal 111. It is operatively connected to control a gear engagement clutch 12, softly, so as to decrease jolts. Stage 11, as such, is known, and a suitable structure to which the present invention is applicable is described in cross referenced application U.S. Ser. No. 867,307, filed Jan. 6, 1978, Rembold et al. The acceleration/deceleration or first derivative of the respective engine speed and transmission speed signals are connected from the outputs of differentiators 3, 7 to the convergence angle portion 103.

Operation: The threshold stage 9 determines the switching state of the transfer switch 104. The output signal from the threshold stage 9 is determined by the input to the frequency/voltage converter 6 which is derived from the speed transducer 5. Thus, transfer switch 104 can change over at a predetermined vehicle speed. Preferably, this speed is at approximately 10 km/h; it is so selected with respect to the vehicle and to the transmission that it is below that speed at which the transmission has changed from first to second gear. Thus, if the vehicle is stopped, or moves only at creep or walking pace, then the portion 101 of gear selector stage 10 is connected to the shock control stage 11. In this range, the signal which is twice differentiated and derived from the output of the motor or engine is used as a command signal; it is this signal which is applied to the first portion 101 so that the shock control stage is commanded, at stopped, or slowly moving vehicle, by a signal corresponding to an actual switching jolt which is derived from rate of change of engine deceleration upon engagement of a gear, and which corresponds to the jolt upon changing a selection lever, or the gear range from neutral to an operating range, that is, drive, or reverse.

As the vehicle continues to accelerate, it will reach a speed which exceeds the predetermined speed set by the threshold stage 9. Transfer switch 104 will change over and the jolt control stage 11 will now be commanded from the second portion 102 and, additionally, from the convergence angle portion 103. Thus, the shock control stage 11 will have a signal applied thereto, representative of actual jolt, which is obtained by twice differentiating the transmission output speed and which corresponds to that gear changing or switching jolt which is caused by changing of gears while the vehicle is moving. Additionally, a signal is applied to the shock control stage—not separately shown as a separate line since the signals can be superimposed, and the drawing is only schematic—which corresponds to the difference between the derivative, with respect to time, of engine output speed and transmission output speed in order to obtain a convergence angle control for additional soft engagement of gear engaging clutches or other friction elements to provide for convergence of output speed of the engine and transmission at a predetermined convergence angle.

The basic inventive concept is directed to deriving an actual jolt or shock value for specific operating conditions and particularly for operating conditions in which the vehicle is moving at slow speed. Depending on the operating conditions, that is, depending upon whether a specific gear selector stage 101, or 102 is in operation, switch 104 is controlled to apply to the shock control stage 11 those signals which are most representative of the actual shock which the vehicle will experience, so that the shock control stage 11 can compare this actual shock with the reference value applied at terminal 111. Thus, the stages 101, 102, 103 can be mere connecting lines which do not process signals as will appear: let it be assumed, first, that the vehicle is stopped, or only creeping, or moving very slowly. A shift command from neutral to drive, or neutral to reverse (N/D; N/R) is commanded. Under those conditions, switch 104 is in the upper position, as shown in the FIGURE, and the shock control stage 11, which is of known type-see referenced application—will receive the second derivative of engine speed as the actual shock value. Thus, the actual shock value, under these conditions, of the jolt is proportional to the second derivative, with respect to time, of engine speed. The shock control stage 11, in manner described in the aforementioned cross referenced application Ser. No. 867,307, Rembold et al, will then provide an engagement command signal to the gear engagement clutch 12 by forming a difference between the actual shock signal and maximum permissible shock signal, which could be compared to the command value, supplied at terminal 111.

After the vehicle has been placed into motion, that is, after it has exceeded a certain speed, for example about 10 km/h, gear shifting will occur in the drive range between various drive gears, in the example illustrated between first second and third gear. Two control arrangements are possible: (a) simple control, based on the second derivative of transmissions output speed by stage 102 or (b) based on the difference between the first derivative of engine speed and transmission output speed respectively, which is based on the convergence angle calculation by stage 103, as described in detail in the aforementioned cross reference REMBOLD application.

The system thus can operate as addition, or improvement over the general system described in the aforementioned REMBOLD application, to which the shock control stage 11 generally corresponds. The gear selector stage 10 provides for selection of the operating parameters applied at the input, that is, to control shifting between neutral and in operating range, or between operating ranges. In accordance with the present invention, the actual jolt value is determined by obtaining the second derivative—with respect to time—of engine speed when shifting between neutral and an operating range of the vehicle, that is, drive, or reverse.

Various changes and modifications may be made within the scope of the inventive concept.

We claim:

1. Gear shifting engagement shock control system for vehicles having an automatic multi-gear transmission having engine speed transducer means (1) providing an engine speed signal;

transmission output speed transducer means (5) providing a transmission output speed signal;

a gear change shock or jolt control stage (11);

a gear selector stage (10);

and clutch means (12) controlled by said shock control stage (11) establishing a driving connection between the engine and the vehicle drive wheels wherein the gear selector stage (10) comprises a first portion (101) controlling change of gears between disengaged or neutral position and an operating gear (R, D), and a second portion (102) controlling change of gears between gear ranges commanding movement of the vehicle (½, ⅔; 3/2, 2/1);

engine speed second derivative (rate-of-acceleration/deceleration) signal transforming means (3, 4) are provided connected to and controlled by said engine transducer means (1) and providing a second derived engine speed signal representative of the second derivative of the engine speed signal, whereby said derived engine speed signal will be representative of the rate of change of acceleration/deceleration of the engine, said engine speed second derivative signal transforming means being connected to and controlling said first portion (101) of the gear selector stage (10);

transmission output second (rate of acceleration/deceleration) derivative signal transforming means (7, 8) are provided, connected to and controlled by said transmission output transducer means (5) and providing a second derived transmission output signal representative of the second derivative of the transmission output speed signal, whereby said second derived transmission output speed signal will be representative of the rate of change of acceleration/deceleration of the output speed of the transmission, said derived signal being applied to the second portion (102) of the gear selector stage (10);

and selective connection means (104) controlled by the transmission output speed signal selectively connecting the output from the first portion, or the second portion, respectively of the gear selector stage to the shock control stage (11) in dependence on sensed speed of the output from the transmission.

2. System according to claim 1, wherein said selective connection means connects the output from the first portion (101) of the gear selector stage (10) to the shock control stage when the output speed of the transmission is below a predetermined speed level and connects the output from the second portion (102) of the gear selector stage to the shock control stage (11) when the output of the transmission is above said predetermined level.

3. System according to claim 1, wherein the second derivative (rate of acceleration/deceleration) signal transforming means (3, 4; 7, 8) comprise serially connected differentiator stages forming the second derivative of the respective input signal thereto, the outputs of said differentiators being connected to the gear selector stage (10).

4. System according to claim 3, wherein the first portion (101) of the gear selector stage (110) is connected to the second differentiator (4) controlled by the engine speed transducer means (1);

and the output from said first portion is connected through said selective connection means (104) to the shock control stage (11) when the output speed from the transmission, as sensed by said transmission output transducer means (5), is below a predetermined level.

5. System according to claim 3, wherein the second differentiator (8) of the differentiator connected to the transmission output speed transducer means (5) is connected to the second portion (102) of the gear selector stage (10);

and the selective connection means (104) connects the output from said second portion to the shock control stage when the output speed of the transmission, as sensed by said transmission output transducer means (5), exceeds a predetermined level.

6. System according to claim 1, further including a speed difference convergence angle control portion (103) having signals representative of engine speed and transmission output speed applied thereto and providing a difference signal representative of said speed differences, said difference signal being connected to and controlling said shock control stage (11) when the output speed of the transmission exceeds a predetermined level.

7. Gear shifting engagement shock control system for vehicles having an automatic multi-gear transmission having engine speed transducer means (1) providing an engine speed signal;

transmission output speed transducer means (5) providing a transmission output speed signal;

a gear change shock or jolt control stage (11) and clutch means (12) controlled by said shock control stage establishing a driving connection between the engine and the vehicle wheels;

and means to reduce the gear shifting engagement shock upon changing the transmission between disengaged or neutral position (N) and an operating gear (R, D) position comprising derivative signal transforming means connected to and controlled by said engine transducer means (1) and providing a second derived (rate of acceleration/deceleration) signal representative of the second derivative—with respect to time—of the engine speed signal, whereby said second derived engine speed signal will be representative of the rate of change of acceleration/deceleration of the engine;

and controlled switch means (104) selectively connecting said second derivative derived engine speed signal to said gear change shock or jolt controlled stage (11) under control of an output signal from said transmission output speed transducer means if said transmission output speed transducer means provides an output signal indicative of operation of the vehicle below a predetermined, low speed value.

8. System according to claim 7 further including a gear selector stage (10) and transferring said second derivative derived engine speed signal to said controlled switch means (104) upon selection of a change of vehicle operation by changing the position of gear selector stage from disengaged, or neutral position (N) to a operating gear (R, D) position.

9. Method to reduce starting jolt or shock upon change of a gear selector lever in an automatic transmission between neutral and an operating range (N/D, N/R) comprising sensing engine output speed and deriving a speed signal representative of said engine output speed;

twice differentiating said speed signal to derive a signal representative of the second derivative of speed and hence of the rate of deceleration of the engine upon placement of a sudden load on the engine;

and controlling a transmission shock control train (11, 12) as a function of said second derivative of the engine output speed signal.

10. Method according to claim 9, including controlling the jolt of gear changes between operating gears upon movement of the vehicle (½, ⅔; 3/2, 2/1) as a function of the rate of change of acceleration/deceleration of the output speed of the transmission;

and controlling the shock control train, selectively, and in dependence on the operating speed of the vehicle with which the transmission is used, selectively;

(a) as a function of the second derivative of engine speed if the vehicle speed is below a predetermined level and (b) as a function of the second derivative of the output speed of the transmission when the vehicle speed is above said predetermined level.

11. Method according to claim 10, wherein said predetermined level is below the speed level at which the automatic transmission changes between first and second gear.

12. Method according to claim 9, including the further step of deriving a signal representative of the rate of change of engine speed; deriving a signal representative of the rate of change of transmission output speed; comparing said rates of change; and additionally controlling said shock control train as a function of the difference of said rate of change of speed signals.

* * * * *